United States Patent
Anzai

(10) Patent No.: US 7,432,955 B2
(45) Date of Patent: Oct. 7, 2008

(54) PORTABLE COMMUNICATION TERMINAL WITH CAMERA AND A METHOD OF CONTROLLING THE SAME

(75) Inventor: Takeshi Anzai, Saitama (JP)

(73) Assignee: NEC Corporation, Tokyo (JP)

( * ) Notice: Subject to any disclaimer, the term of this patent is extended or adjusted under 35 U.S.C. 154(b) by 734 days.

(21) Appl. No.: 10/883,728

(22) Filed: Jul. 6, 2004

(65) Prior Publication Data

US 2005/0018072 A1    Jan. 27, 2005

(30) Foreign Application Priority Data

Jul. 23, 2003    (JP)    ............... 2003/277943

(51) Int. Cl.
H04N 5/232    (2006.01)
H04B 7/24    (2006.01)
H04B 1/40    (2006.01)
H04B 1/04    (2006.01)
H04M 1/00    (2006.01)

(52) U.S. Cl. ............... 348/211.2; 348/211.4; 348/211.5; 455/88; 455/574; 455/127.1; 455/127.5

(58) Field of Classification Search ............. 348/211.2, 348/552, 372, 211.99, 211.1, 211.3, 211.4, 348/211.5; 455/39, 550.1, 502, 67.11, 343.1, 455/88, 553.1, 556.2, 557, 574, 575.1, 127.1, 455/127.5, 230, 231, 334, 343.2, 556.1

See application file for complete search history.

(56) References Cited

U.S. PATENT DOCUMENTS 5,815,819 A * 9/1998 Ohta et al. .................. 455/574

| 6,725,068 B2 * | 4/2004 | Higuchi et al. | ............... 455/574 |
| 6,950,673 B2 * | 9/2005 | Asada | ...................... 455/550.1 |
| 6,957,083 B2 * | 10/2005 | Ikeda et al. | ............... 455/556.1 |

FOREIGN PATENT DOCUMENTS

| JP | 2000-244634 | 9/2000 |
| JP | WO 01/39406 | 5/2001 |
| JP | 2001-186488 | 7/2001 |
| JP | 2002-9688 | 1/2002 |
| JP | 2002-261880 | 9/2002 |

(Continued)

OTHER PUBLICATIONS

Japanese Office Action dated Sep. 12, 2006, with partial English translation.

(Continued)

*Primary Examiner*—NgocYen T. Vu
*Assistant Examiner*—Peter Chon
(74) *Attorney, Agent, or Firm*—McGin IP Law Group, PLLC

(57) ABSTRACT

A portable communication terminal with a camera carries out an intermittent reception operation during standby reception in order to reduce power consumption. The portable communication terminal stops an operation clock (16) for a camera (8) right before a time period of a reception slot (RX) during the intermittent reception operation. In the portable communication terminal, a photographed image right before stop of the operation clock is displayed on a display unit (9) for a stop time period until restart of the operation clock (16). The stop time period is short so as not to be recognized by eyes of a human being.

19 Claims, 4 Drawing Sheets

FOREIGN PATENT DOCUMENTS

JP 2002261880 A * 9/2002

OTHER PUBLICATIONS

Japanese Office Action dated Nov. 21, 2006, with partial English translation.

European Search Report dated Feb. 12, 2008.

L. Benini, et al., "System-level Dynamic Power Management," Low-Power Desgin, 1999. Proceedings. IEEE Alessandro Volta Memorial Workshop on Como, Italy Mar. 4-5, 1999, Los Alamitos, CA USA, IEEE Comput, SOC, US. Mar. 4, 1999, pp. 23-31, XP010323924.

* cited by examiner

PORTABLE COMMUNICATION TERMINAL WITH CAMERA AND A METHOD OF CONTROLLING THE SAME

BACKGROUND OF THE INVENTION

1. Field of the Invention

The present invention relates in general to a technical field of a portable communication terminal such as a mobile telephone. In particular, the invention relates to a technical field of a portable communication terminal equipped with a camera.

2. Description of the Related Art

Heretofore, in a portable communication terminal such as a mobile telephone, in general, in order to pursue enhancement of portability, a miniature battery is forced to be used therein. For this reason, in a conventional portable communication terminal, in order to realize low power consumption, there is adopted an operation control method including carrying out intermittent reception during standby reception.

When in the portable communication terminal for which such an operation control method is adopted, a necessary communication protocol processing is executed between the portable communication terminal and a base station during call or packet communication, a radio communication unit or a control unit for a communication processing is operated. On the other hand, this portable communication terminal, during the standby operation, makes transition to an intermittent reception mode, and also for the purpose of mainly maintaining reception synchronization, carries out a reception operation once for one super-frame (e.g., about 720 ms) in the intermittent reception mode. Then, the portable communication terminal complying with such an operation control method carries out the intermittent operation for power-down of a radio communication unit, a central processing unit (CPU) and the like for a time period other than a time period for one reception operation in the intermittent reception mode to reduce the power consumption.

As an example of a portable communication terminal of such an operation control method, in recent years, a mobile telephone equipped with a camera (image pickup device) has remarkably come into wide use in the field of the mobile telephone. Then, in a case where using the camera function as well as the radio communication function, when it is unnecessary to operate the radio communication unit and the CPU, an operation mode of such a mobile telephone with a camera is set to the intermittent reception mode.

The camera installed in such a mobile telephone is a camera adapted to execute an image processing with respect to digital signals (hereinafter referred to as "a digital camera" for short when applicable). In general, many digital cameras are several tens of MHz in frequency of an operation clock signal. Then, an image data signal outputted from such a digital camera becomes a signal having a frequency corresponding to the frequency of the operation clock signal.

Here, let us consider a case where in the mobile telephone with a camera operated in accordance with such an operation clock signal, the camera is used during the standby in the intermittent reception mode. In this case, the mobile telephone with a camera restarts a reception operation at a predetermined timing. As for a problem encountered in restarting the reception operation, the mobile telephone with a camera has a problem in that high frequency components of an output signal of the camera in operation before restart of the reception operation are radiated from a camera body, a signal wiring pattern on a circuit board, an IC for an image processing, and the like. This radiation becomes a cause of deterioration in reception sensitivity since the radiation brings about an increase in noise for a radio communication unit.

As measures against such a problem due to the high frequency signals, various methods including coping with such a problem have been proposed for the conventional mobile telephone with a camera. More specifically, for such a mobile telephone with a camera, there have been proposed a method including providing a bypass capacitor within a control circuit, a method including suitably changing a design of a wiring pattern on a circuit board, a method including strengthening GND (earth) of a circuit board, and the like.

However, in a case where a circuit as a measure for preventing an adverse effect due to the high frequency signals is provided in the mobile telephone with a camera, there are caused an increase in the number of components or parts and reduction in the degree of freedom in mounting of a circuit board. In general, the mobile telephone with a camera is limited in miniaturization and lightening as compared with a mobile telephone equipped with no camera. However, from the general market request, for a portable communication terminal such as a mobile telephone, portability is regarded as important. For this reason, the installation of the circuit as a measure for the above-mentioned problem which obstructs miniaturization and lightening becomes a serious program from a viewpoint as well of convenience and salability of the mobile telephone with a camera.

Then, in JP 2002-261880 A, there is proposed a mobile telephone with a camera in which the above-mentioned problem due to the high frequency signals caused along with the intermittent reception operation is taken into consideration.

That is, JP 2002-261880 A proposes a technique in which an operation clock signal for a camera is stopped for a time period when a mobile telephone with a camera is operated in an intermittent reception mode, the time period containing a reception slot during an standby reception operation.

More specifically, in the mobile telephone described in JP 2002-261880 A, the camera is operated in accordance with the operation clock signal only for a time period of one frame (about 30 ms) right after an end timing of the reception slot during a super-frame (e.g., 720 ms). On the other hand, in this mobile telephone, the camera operation clock signal is stopped for other time periods. Here, other time periods concerned are expressed as follows.

$$\text{super} - \text{frame } (720 \text{ ms}) - \text{reception slot } (6.6 \text{ ms}) - 1 \text{ frame } (30 \text{ ms}) = 683.4 \text{ ms} \quad (1)$$

In the mobile telephone described in JP 2002-261880 A, the camera is operated only for a time period of about 40 ms obtained by adding the reception slot in the super-frame to the time period of one frame right after the reception slot as expressed in Equation 1 to thereby generate image pick-up data. Thus, in such a mobile telephone, a problem is encountered in that when an image based on that image pickup data is displayed on a display unit, the displayed image is poor in visibility, and a user is therefore given a sense of incompatibility.

In addition, in the technique described in JP 2002-261880 A, the image pickup data for one frame is transferred from the camera to a control unit every super-frame. For this reason, a frame rate of the display unit is judged to become about 1.39 fps. Consequently, when a moving body is photographed with the mobile telephone with a camera operated as described above, likewise, the problem is still encountered in that the displayed image is poor in visibility.

SUMMARY OF THE INVENTION

It is an object of the present invention to provide a portable communication terminal with a camera which is capable of preventing an adverse effect from being exerted on a radio communication unit due to signals from the camera during standby reception, and of preventing an image captured with the camera and displayed on a display unit from giving a user a sense of incompatibility, and a method of controlling the same.

In order to attain the above-mentioned object, an aspect of the present invention is constituted as follows.

That is, there is provided a portable communication terminal with a camera, for carrying out an intermittent reception operation during standby reception, characterized by including:

clock control means (CPU 1, intermittent reception control unit 4, AND gate 31) for providing a stop time period in an operation clock (13) of a camera (8) by stopping the operation clock at a first timing (Q) right before a reception slot (RX) during the intermittent reception operation and releasing the stop at a second timing (P) right after end of the reception slot; and display control means (image processing unit 7) for outputting, to display means (display unit 9), image data obtained right before outputted image data from the camera is stopped, over the stop time period in correspondence to the stop of the operation clock based on the first timing.

In this case, the display control means, for example, may continuously output the image data over the stop time period.

Further, the camera may stop to output the image data over the stop time period in the operation clock.

In a preferred embodiment, each of the first and second timings is a timing having an establishment timing of reception synchronization based on the reception slot as a reference.

Then, in this case, the clock control means may time a predetermined time period (T3) until the second timing comes on a basis of the establishment timing based on the reception slot.

In addition, anther aspect of the present invention is constituted as follows.

That is, there is provided a method of controlling a portable communication terminal with a camera, for carrying out an intermittent reception operation during standby reception, characterized by including:

providing a stop time period in an operation clock (13) of a camera (8) by stopping the operation clock at a first timing (Q) right before a reception slot (RX) during the intermittent reception operation and releasing the stop at a second timing (P) right after end of the reception slot; and displaying a same image obtained from image data right before outputted image data from the camera is stopped, over the stop time period in correspondence to the stop of the operation clock based on the first timing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Preferred embodiments of the present invention will now be described in detail in accordance with the accompanying drawings.

A portable communication terminal with a camera according to the present invention will hereinafter be described in detail with reference to the accompanying drawings.

First Embodiment

Figure 1:
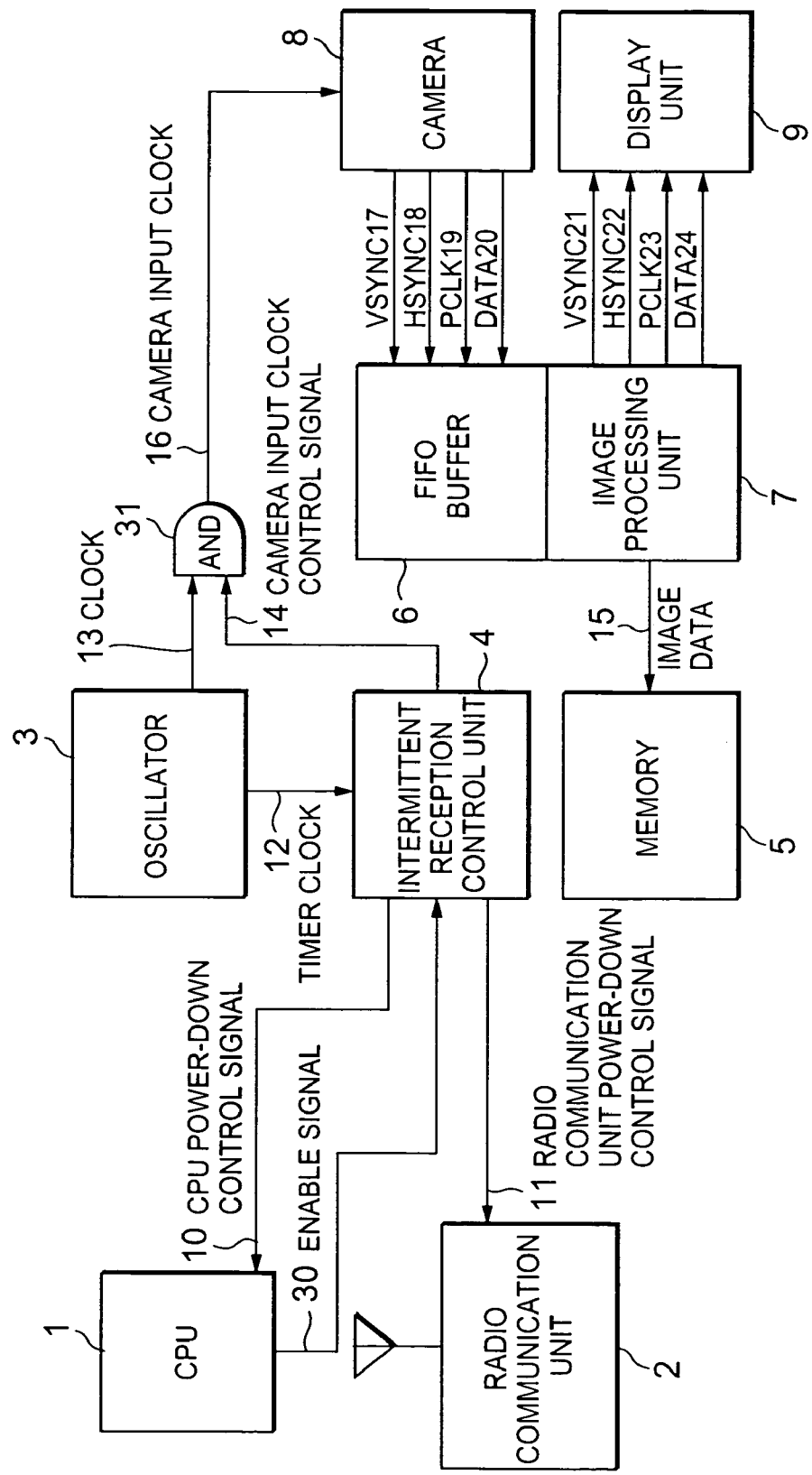
FIG. 1 is a block diagram showing a configuration of a portable communication terminal with a camera according to a first embodiment of the present invention.

FIG. 1 is a block diagram showing a configuration of a portable communication terminal with a camera according to a first embodiment of the present invention.

A portable communication terminal with a camera shown in FIG. 1, as an example, a mobile telephone complying with a Time Division Multiple Access (TDMA) method regulated in a Research & Development Center for Radio System (RCR) 27. In addition, a control method which is described in "Description of the Related Art" and which includes carrying out an intermittent reception operation during standby reception is adopted for this mobile telephone.

The portable communication terminal with a camera according to this embodiment roughly includes: a CPU 1; a radio communication unit 2; an oscillator 3; an intermittent reception control unit 4; a memory 5; a first-in first-out (FIFO) buffer 6; an image processing unit 7; a camera 8; a display unit 9; and an AND gate 31.

That is, the CPU 1, when the mobile telephone concerned carries out the intermittent reception operation, manages a transmission/reception protocol implemented from the radio communication unit 2 for a time period other than a time period for a reception operation made by the intermittent reception control unit 4.

The radio communication unit (radio communication circuit) 2 executes a transmission/reception processing in radio communication with a base station in accordance with an instruction issued from the CPU 1. Moreover, the radio communication unit 2 controls a time period required to execute such a transmission/reception processing in accordance with an instruction issued from the intermittent reception control unit 4 in this embodiment.

The oscillator 3 generates an operation clock signal 13 for the camera 8, and a timer clock signal 12 serving as an operation clock signal for the intermittent reception control unit 4 at all times during the operation of the portable communication terminal with a camera according to this embodiment. That is to say, the oscillator 3 generates the clock signals 12 and 13 concerned even during the reception operation made at predetermined time intervals in an intermittent reception mode.

The intermittent reception control unit (intermittent reception control circuit) 4, when the portable telephone concerned carries out the intermittent reception operation, governs a timing for power-down control for the portable telephone concerned.

The memory 5 is a memory for storing therein image data 15 outputted from the image processing unit 7.

The FIFO buffer 6 is an FIFO buffer for receiving as its input synchronous signals 17 to 19 (their details will be described later) and image data 20 outputted from the camera 8.

The image processing unit (image processing circuit) 7 reads out the image data 20 stored in the FIFO buffer 6 and subjects the image data 20 to an image processing for display.

The camera (image pickup device) 8 includes an image pickup device having a charge coupled device (CCD), a complementary metal oxide semiconductor (CMOS), and the like which are operated in accordance with a camera input clock signal 16.

The display unit 9 displays an image on a display device (not shown) such as a liquid crystal display unit on the basis of various synchronous signals 21 to 23 and the image data 24 inputted from the image processing unit 7.

Then, the AND gate (AND) 31 obtains a logical sum of a clock signal 13 outputted from the oscillator 3 and a camera input clock control signal 14 to thereby generate the camera input clock signal 16.

The operations of the above-mentioned blocks will now be further continuously described.

The intermittent reception control unit 4 has three kinds of timers 27 to 29 (they are not illustrated in FIG. 1 and their details will be described later) for generating a CPU power-down control signal 10, a radio communication unit power-down control signal 11, and a camera input clock control signal 14, respectively, in accordance with the timer clock 12. Here, time periods T1 to T3 timed with the timers 27 to 29, respectively, take suitable values which are set in the intermittent reception control unit 4 in advance in order to meet a relationship and an operation which will be described later.

Note that the camera input clock control signal 14 is inputted to one input terminal of the AND gate 31. In addition, the clock signal 13 from the oscillator 3 is applied to the other input terminal of the AND gate 31. The camera input clock signal 16 is inputted from an output terminal of the AND gate 31 to the camera 8.

In this embodiment, when the camera input clock signal 16 is enabled, the camera 8 carries out the image pickup operation to output the image data 20.

In FIG. 1, reference symbols VSYNCs 17 and 21 designate vertical synchronous signals, respectively. Reference symbols HSYNCs 18 and 22 designate horizontal synchronous signals, respectively. Also, reference symbols PCLKs 19 and 23 designate pixel clock signals, respectively.

In addition, an enable signal 30 sent from the CPU 1 to the intermittent reception control unit 4 is a control signal in accordance with which the camera input clock control signal 14 is to be enabled. Note that the FIFO buffer 6 carries out the timing buffering which is necessary when the signals, in response to the input signals from the camera 8, are outputted to the display unit 9 and the memory 5, respectively.

Also, the image processing unit 7 converts the image data 20 from the camera 8 into image data 24 able to be displayed on the display unit 9. Moreover, the image processing unit 7 executes a processing for converting the image data 20 into an image data signal 15 in order to store the resultant image data signal 15 in the memory 5.

In this embodiment, the CPU 1 is operated even in a power-down state (i.e., in a sleep state or in a stop step), whereby the camera 8, the FIFO buffer 6, the image processing unit 7, and the display unit 9 are operated so as to allow the image captured with the camera 8 to be displayed on the display unit 9.

A description will hereinafter be given with respect to characteristic operation control in the portable communication terminal with a camera having the configuration shown in FIG. 1 with reference to FIGS. 2 and 3.

Figure 2:
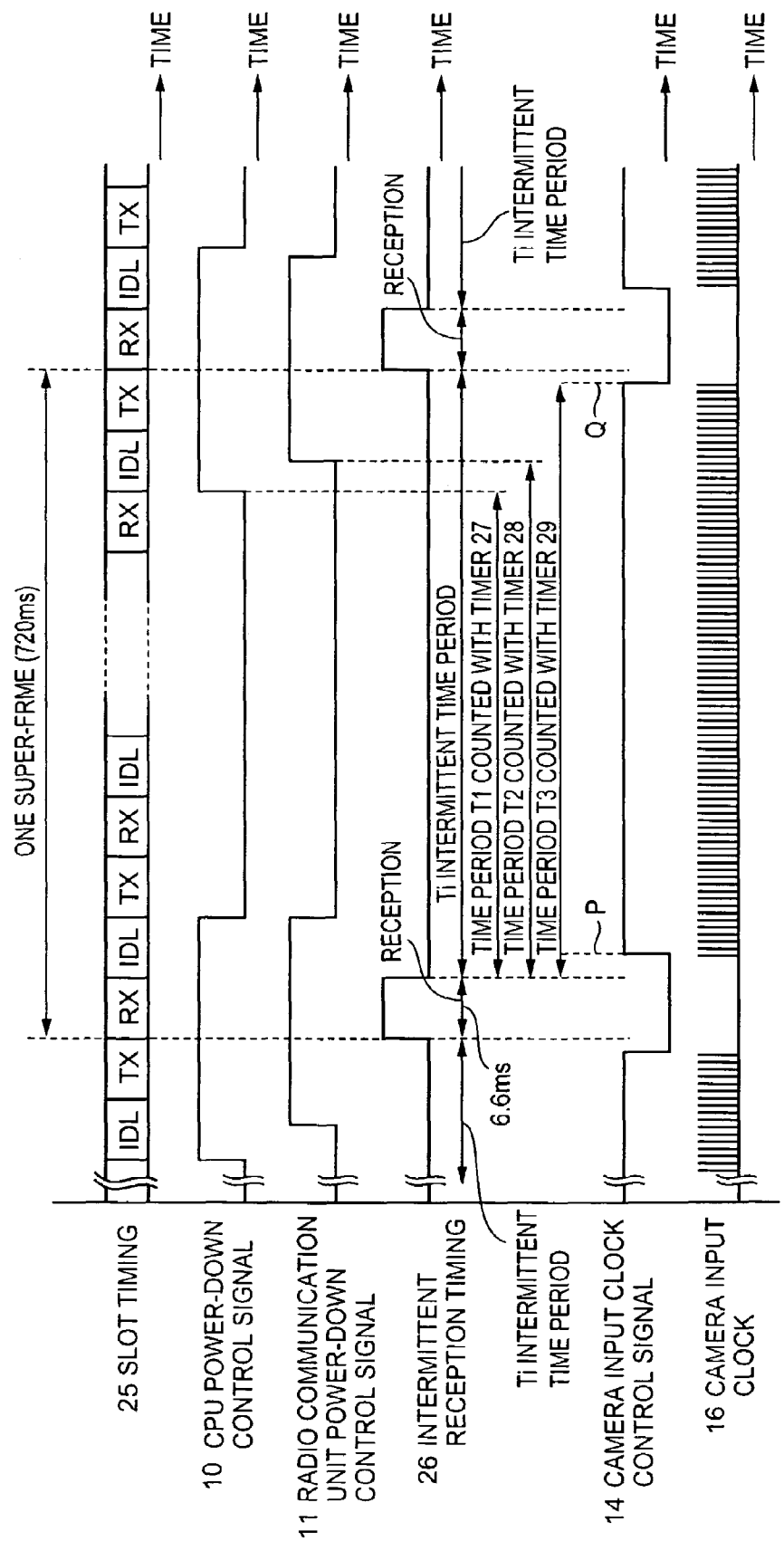
FIG. 2 is a timing chart showing an operation of the portable communication terminal with a camera according to the first embodiment shown in FIG. 1.

FIG. 2 is a timing chart showing an operation of the portable communication terminal with a camera shown in FIG. 1. Also, FIG. 3 is a timing chart showing details of an input/output operation of the camera 8 in the portable communication terminal with a camera shown in FIG. 1.

Firstly, in FIG. 2, a slot timing 25 schematically shows a transmission/reception timing signal exchanged between the portable telephone according to this embodiment and a base station (not shown).

At the slot timing 25, one super-frame, as shown in Fig. 2, has a plurality of time slots (hereinafter referred to as "slots" for short when applicable) constituting a control carrier. One super-frame, as an example, has a cycle of 720 ms. Also, in one super-frame, reference symbol RX designates a reception slot, reference symbol IDL designates an idle slot, and reference symbol TX designates a transmission slot. Note that one slot has a time period of 6.6 ms.

After carrying out the reception synchronization establishment with the reception slot RX of a certain super-frame as a trigger in the intermittent reception mode during the standby, the portable communication terminal with a camera according to this embodiment makes transition to a dormant mode over a time period (intermittent time period Ti) until a next super-frame starts. That is to say, at an intermittent reception timing 26 shown in FIG. 2, a time period required for the reception synchronization establishment is expressed as an ON state. On the other hand, the dormant mode (for the intermittent time period Ti) is expressed as an OFF state.

In the dormant mode, in order to reduce the power consumption, the CPU 1 is powered down in accordance with the CPU power-down control signal 10 outputted from the intermittent reception control unit 4. Moreover, in the dormant mode, the radio communication unit 2 is powered down in accordance with the radio communication unit power-down control signal 11 outputted from the intermittent reception control unit 4.

Then, as shown in FIG. 2, a timing at which the CPU power-down control signal 10 rises is managed by the timer 27 adapted to start to time a time period at a timing having reception synchronization established thereat. In addition, the radio communication unit power-down control signal 11 is managed by the timer 28 adapted to start to time a time period at that timing.

In this embodiment, the intermittent reception control unit 4 can recognize a timing at which the reception synchronization is established. Then, the intermittent reception control unit 4 outputs an interrupt signal (not shown) generated at that timing to the CPU 1. In addition, the intermittent reception control unit 4 starts to reset the timers 27 to 29 in correspondence to recognition of reception synchronization establishment.

Hence, the timer 27 counts a time period T1 when a timing must be determined at which the CPU 1 after one super-frame is powered up (i.e., at a timing must be determined at which the CPU 1 makes transition to an active state).

In addition, the timer 28 counts a time period T2 when the timing must be determined at which the radio communication unit 2 is powered up.

Also, the timer 29 counts a time period T3 when the timing must be determined at which the camera input clock 16 is stopped.

More specifically, the CPU power-down control signal 10, in the intermittent reception mode, is enabled (in an ON state) over a time period of several slots in and before and after the reception slot RX in correspondence to time-measurement completion of the time period T1 counted with the timer 27.

In addition, the radio communication unit power-down control signal 11, in the intermittent reception mode, is enabled (in an ON state) over a time period of several slots in and before and after the reception slot RX in correspondence to time-measurement completion of the time period T2 counted with the timer 28. But, the power up time period (T2) of the radio communication unit 4 is set slightly shorter than the power up time period (T1) of the CPU 1.

Note that in this embodiment, when the CPU power-down control signal 10 is enabled, the CPU 1 makes transition to the active state. When the radio communication unit power-down control signal 11 is enabled, the radio communication unit 2 makes transition to the active state.

Next, a description will hereinafter be given with respect to output control for the camera input clock control signal 14. As described above, the CPU 1 can recognize the timing at which the reception synchronization is established on the basis of the interrupt signal from the intermittent reception control unit 4. At this timing, the camera input clock control signal 14 is enabled (in an ON state) at a timing P right after the reception slot RX through the intermittent reception control unit 4 on the basis of the enable signal 30 (refer to FIG. 1) outputted from the CPU 1.

Then, the intermittent reception control unit 4 disables the camera input clock control signal 14 (in an OFF state, i.e., in a clock stop state) enabled as described above right before the reception slot RX in correspondence to arrival of a timing Q at which the time-measurement of the time period T3 counted with the timer 29 is completed.

The time periods T1 to T3 counted with the timers 27 to 29, respectively, are set as described above in the intermittent reception mode, whereby the AND gate 31 is disabled which (outputs a negative logical sum) during the time period of the reception slot RX. It is thus possible to stop the operation for inputting the camera input clock signal 16 to the camera 8.

Next, reference will now be made to FIG. 3. FIG. 3 shows a timing chart explaining a relationship between the signals inputted to the camera 8 and the signals outputted from the camera 8.

The operation clock signal for the camera 8 is stopped in correspondence to a situation in which the camera input clock signal 16 becomes a stop state in accordance with the above-mentioned control. As a result, the signals VSYNC17, HSYNC18 and PCLK19, and the image data DATA20 outputted from the camera 8 are stopped accordingly. Then, these signals are also restarted to be outputted in correspondence to restart of supply of the camera input clock 16.

The image data from the camera 8 is inputted to the FIFO buffer 6. The image processing unit 7 generates the signals VSYNC21, HSYNC22 and PCLK23, and the data DATA24 in order to display the image obtained from the image data read out from the FIFO buffer 6 on the display unit 9.

The image captured with the camera 8 is displayed on the display unit 9 and its image data is stored in the memory 5 through the above-mentioned operation.

Figure 3:
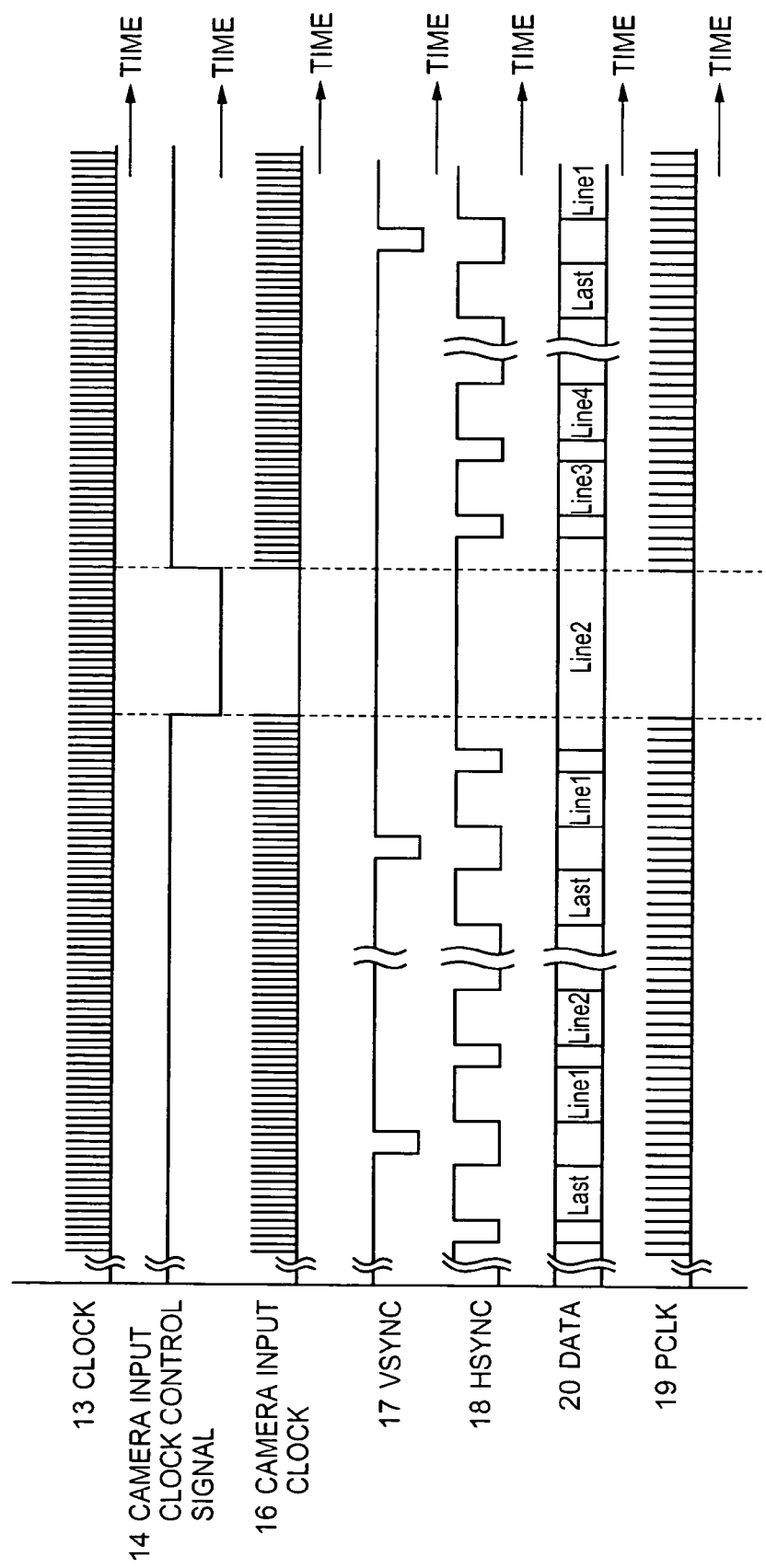
FIG. 3 is a timing chart showing details of an input/output operation of a camera 8 in the portable communication terminal with a camera shown in FIG. 1.

When detecting that all the image data 20 stored in the FIFO buffer 6 are read out and thus the FIFO buffer 6 becomes empty in order to display the image on the display unit 9 even a time period when the camera 8 is stopped as shown in FIG. 3, the image processing unit 7 continuously outputs the image data used in the final image display to the display unit 9 over such a stop time period.

Note that when the FIFO buffer 6 becomes empty in stored data, a buffer for informing the outside of this effect is present, and therefore this buffer can be used in a method including detecting that the FIFO buffer 6 becomes empty. However, the present invention is not intended to be limited to such an apparatus configuration.

The example of FIG. 3 is shown so that the image data of a horizontal line Line 2 is continuously displayed. That is to say, the data 20 is image data for one sheet (one frame) displayed on the display unit 9. This image data has a plurality of lines from "line 1" to "Last". Then, "horizontal line Line 2" is the second image data of a plurality of lines concerned.

That is, according to this embodiment, in the portable communication terminal shown in FIG. 1, the operation clock is stopped in correspondence to a situation in which the camera input clock control signal 14 is disabled. Then, the portable communication terminal concerned outputs the image data 24 outputted right before the stop on the display unit 9 over a time period when the output of the image data 20 from the camera 8 is kept stopped in correspondence to the stop of the operation clock signal.

Thus, the time period when the camera input clock signal 16 is kept stopped is at least a time period from a time point right before start of the reception slot RX to a time point right after the end of the reception slot RX in the slot timing 25. However, this time period is given room to some extent (about 10 ms), whereby even when the image displayed on the display unit 9 is not changed, this state can not be recognized by eyes of a human being. As a result, no reduction in visibility is caused in the display unit 9.

In addition, in JP 2002-261880 A, the frame rate of the display unit, as described above, is about 1.39 fps. In this embodiment, however, since the display at a higher frame rate is possible, the visibility when photographing a moving body is further enhanced.

As described above, the first embodiment is constituted so that in the intermittent reception mode, the camera input clock signal 16 is stopped over the time period of the reception slot (RX). As a result, in addition to the camera input clock signal 16, all the signals VSYNC 17, HSYNC 18 and PCLK 19, and the data DATA 20 can also be stopped over the time period concerned.

According to the portable communication terminal with a camera of this embodiment having such control constitution, an effect is obtained in that deterioration is not caused in reception sensitivity due to the radiation of the high frequency components of the output signal from the camera within the apparatus. Moreover, according to the portable communication terminal with a camera of this embodiment, there is an advantage in that even during the reception operation in the intermittent reception mode, no visibility reduction when the image is photographed with the camera is caused.

Second Embodiment

Figure 4:
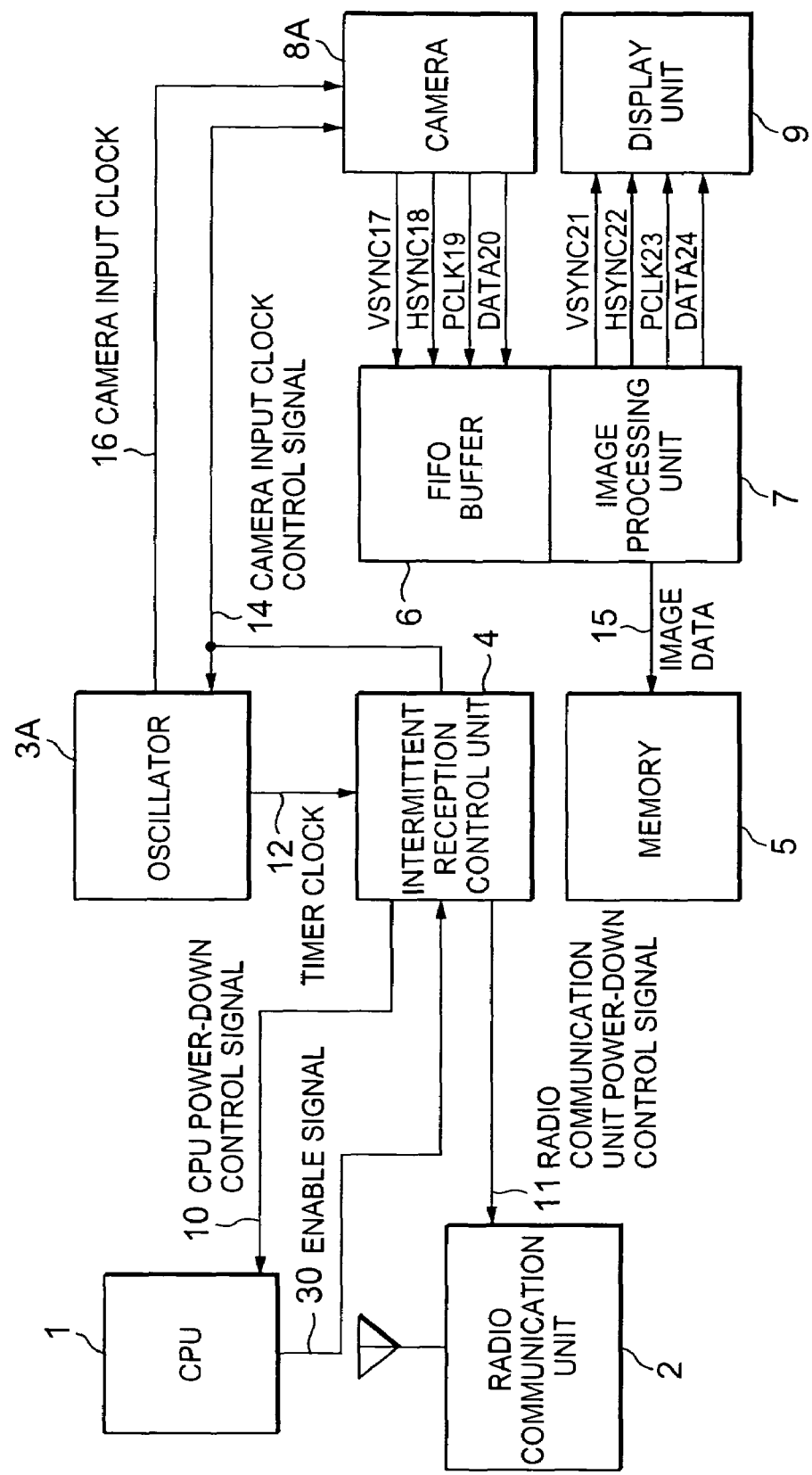
FIG. 4 is a block diagram showing a configuration of a portable communication terminal with a camera according to a second embodiment of the present invention.

FIG. 4 is a block diagram showing a configuration of a portable communication terminal with a camera according to a second embodiment of the present invention.

In an apparatus configuration shown in the FIG. 4, the same constituent elements as those of the first embodiment shown in FIG. 1 are designated with the same reference numerals. In the first embodiment, the operation of the camera 8 is stopped in accordance with the camera input clock signal 16 outputted from the AND gate 31 on the basis of the output clock signal 13 from the oscillator 3. On the other hand, in this embodiment, an oscillator 3A is provided with a power-down function or a function of controlling stop of clock signal output. Moreover, a camera 8A is provided with a function of controlling output of the image data 20. In this case, the output restart of the camera input clock signal 16 by the oscillator 3A is realized by enabling the camera input clock control signal 14 in response to reception of the enable signal 30 in the intermittent reception control unit 4.

Note that in this embodiment as well, the configuration and timing at which the CPU 1 outputs the enable signal 30 to the intermittent reception control unit 4 are the same as those of the first embodiment.

Then, in the portable communication terminal with a camera shown in FIG. 4, the control is carried out so that both the operations of the oscillator 3A and the camera 8A are stopped in accordance with the camera input clock control signal 14 from the intermittent reception control unit 4. As a result, in the stop state, the oscillator 3A does not output the camera input clock signal 16. Thus, the image data 20 is not also outputted from the camera 8A. According to such an apparatus configuration, not only the image data from the camera 8A, but also the camera input clock signal 16 from the oscillator 3A are not outputted onto a circuit board provided in the portable communication terminal at all. Consequently, an effect is offered in that the high frequency control with the apparatus configuration of this embodiment is superior to that of the first embodiment shown in FIG. 1.

As described above, in the portable communication terminal with a camera according to each of the first and second embodiments, during the reception operation in the intermittent reception mode, in order to reduce the power consumption., the operation clock signal for the camera 8 (8A) is stopped at the timing right before the time period of the reception slot RX to thereby stop the operation of the camera concerned. Then, in the portable communication terminal with a camera, for the time period when the operation clock is kept stopped, the image data right before the camera is stopped is outputted to the display unit 9. According to such an apparatus configuration, it is possible to prevent the adverse effect from being exerted on the radio communication unit 2 due to the output signal of the camera during the standby reception. Moreover, according to such an apparatus configuration, the visibility of the image displayed on the display unit 9 for the stop time period can be enhanced without giving a user a sense of incompatibility.

Note that the portable communication terminal with a camera described in each of the first and second embodiments is suitably applied to a portable communication terminal for carrying out radio communication, such as a mobile telephone or personal digital assistants (PDA).

In addition, in each of the first and second embodiments, the portable communication terminal with a camera according to the present invention, as an example, is applied to the mobile telephone complying with the TDMA method. However, the range of application of the present invention is not limited to such a communication method. That is to say, the present invention can be widely applied to a communication method typified by a Code Division Multiple Access (CDMA) method for example as long as the communication method is of a type in which the reception synchronization is established between the portable communication telephone and the base station on the basis of the super-frame forming a control carrier.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A portable communication terminal with a camera, for carrying out an intermittent reception operation during standby reception, comprising:
   a clock control unit that provides a stop time period in an operation clock of a camera by stopping the operation clock at a first timing prior to a reception slot during the intermittent reception operation and that releases the stop at a second timing after an end of the reception slot; and
   a display control unit that outputs, to a display image, data obtained prior to outputted image data from the camera is stopped, over the stop time period in correspondence to the stop of the operation clock based on the first timing,
   wherein the second timing is delayed by a predetermined period after the end of the reception slot.

2. The portable communication terminal with a camera according to claim 1, wherein said display control unit continuously outputs the image data over the stop time period.

3. The portable communication terminal with a camera according to claim 1, further comprising an oscillator for generating the operation clock,
   wherein said clock control unit controls an operation of the oscillator in accordance with an operation clock having the stop time period provided therein.

4. The portable communication terminal with a camera according to claim 1, wherein the camera stops to output the image data over the stop time period in the operation clock.

5. The portable communication terminal with a camera according to claim 2, wherein the camera stops to output the image data over the stop time period in the operation clock.

6. The portable communication terminal with a camera according to claim 1, wherein each of the first and second timings is a timing having an establishment timing of reception synchronization based on the reception slot as a reference.

7. The portable communication terminal with a camera according to claim 6, wherein said clock control wilt times a predetermined time period until the second timing comes on a basis of the establishment timing based on the reception slot.

8. The portable communication terminal with a camera according to claim 2, wherein each of the first and second timings is a timing having an establishment timing of reception synchronization based on the reception slot as a reference.

9. The portable communication terminal with a camera according to claim 8, wherein said clock control unit times a predetermined time period until the second timing comes on a basis of the establishment timing based on the reception slot.

10. The portable communication terminal with a camera according to claim 4, wherein each of the first and second timing is a timing having an establishment timing of reception synchronization based on the reception slot as a reference.

11. The portable communication terminal with a camera according to claim 10, wherein said clock control unit times a predetermined time period until the second timing comes on a basis of the establishment timing based on the reception slot.

12. The portable communication terminal with a camera according to claim 1, wherein said clock control unit controls a power-up timing of at least one of a central processing unit and a radio communication unit of its terminal on a basis of the establishment timing of the reception synchronization based on the reception slot to realize the intermittent reception operation.

13. The portable communication terminal with a camera according to claim 1, wherein the portable communication terminal with a camera comprises a mobile telephone with a camera.

14. A portable communication terminal with a camera, for carrying out an intermittent reception operation during standby reception, comprising:
  clock control means for stopping an operation clock of a camera at a first timing prior to a reception slot during the intermittent reception operation, and for releasing the stop at a second timing after an end of the reception slot to provide a stop time period in the operation clock; and
  display control means far outputting, to display means, image data obtained prior to outputted image data from the camera is stopped, over the stop time period in correspondence to the stop of the operation clock based on the first timing,
  wherein the second timing is delayed by a predetermined period after the end of the reception slot.

15. A method of controlling a portable communication terminal with a camera, for carrying out an intermittent reception operation during standby reception, comprising:
  generating a stop time period in an operation clock of a camera by stopping the operation clock at a first timing prior to a reception slot during the intermittent reception operation and releasing the stop at a second timing after an end of the reception slot; and
  displaying a same image obtained from image data prior to outputted image data from the camera is stopped, over the stop time period in correspondence to the stop of the operation clock based on the first timing,
  wherein the second timing is delayed by a predetermined period after the end of the reception slot.

16. The portable communication terminal with a camera according to claim 1, wherein the time period when the camera input clock signal is kept stopped is greater than the time period from a time point before a start of the reception slot to a time point after the end of the reception slot.

17. The portable communication terminal with a camera according to claim 1, wherein the stop time period from a time point before start of the reception slot to a time point after the end of the reception slot is approximately 10 ms.

18. The portable communication terminal with a camera according to claim 14, wherein the time period when the camera input clock signal is kept stopped is greater than the time period from a time point before a start of the reception slot to a time point after the end of the reception slot.

19. The method of controlling a portable communication terminal with a camera according to claim 15, wherein the time period when the camera input clock signal is kept stopped is greater than the time period from a time point before a start of the reception slot to a time point after the end of the reception slot.

* * * * *